US009183029B2

United States Patent
Tsirkin

(10) Patent No.: US 9,183,029 B2
(45) Date of Patent: Nov. 10, 2015

(54) SYNCHRONIZING BACKEND PERIPHERAL DEVICES WITH A VIRTUAL MACHINE RUNNING STATE

(75) Inventor: Michael S Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 1044 days.

(21) Appl. No.: 13/036,742

(22) Filed: Feb. 28, 2011

(65) Prior Publication Data

US 2012/0222027 A1 Aug. 30, 2012

(51) Int. Cl.
*G06F 9/455* (2006.01)
(52) U.S. Cl.
CPC .. *G06F 9/45558* (2013.01); *G06F 2009/45579* (2013.01)
(58) Field of Classification Search
CPC combination set(s) only.
See application file for complete search history.

(56) References Cited

U.S. PATENT DOCUMENTS

| 7,543,095 | B2 * | 6/2009 | Belmar et al. | 710/260 |
| 2009/0240963 | A1 * | 9/2009 | Zimmer et al. | 713/310 |
| 2011/0196968 | A1 * | 8/2011 | Kobayashi et al. | 709/226 |

* cited by examiner

*Primary Examiner* — Eric C Wai
(74) *Attorney, Agent, or Firm* — Lowenstein Sandler LLP

(57) ABSTRACT

A mechanism for synchronizing backend peripheral devices with a virtual machine (VM) running state is disclosed. A method of the invention includes modifying a running state of a (VM managed by a hypervisor of a host machine, and updating a VM state indication associated with the VM to reflect the change in running state of the VM, wherein a peripheral device associated with the VM accesses the VM state indication to determine wh her to continue processing a VM state changing instruction.

20 Claims, 4 Drawing Sheets

SYNCHRONIZING BACKEND PERIPHERAL DEVICES WITH A VIRTUAL MACHINE RUNNING STATE

TECHNICAL FIELD

The embodiments of the invention relate generally to virtualization systems and, more specifically, relate to a mechanism for synchronizing backend peripheral devices with a virtual machine running state.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

Often times, a VM will utilize peripheral devices. These peripheral devices may be software that is implemented by the hypervisor for the VM, or hardware devices outside of the hypervisor that are assigned to the VM. For example, peripheral devices may include, but are not limited to, a mouse, graphics card, serial device, or network device.

A current problem with utilizing peripheral devices with VMs is that the hypervisor may stop and/or start a VM at any moment. This stopping and starting is not concurrent with the peripheral device stopping and starting. In other words, when the hypervisor stops a VM, the peripheral devices of that VM are not affected by this change in status. For instance, a peripheral device implemented as software is run on a separate thread than the VM and does not have much information about the VM.

A hardware or software peripheral device may still receive events from a VM or end user and will typically acts on these events regardless of whether the VM is stopped or not. Consequently, the peripheral device may change the VM state (e.g., VM memory) after the VM has stopped. This scenario can cause problems for a VM and the hypervisor, such as complicating debugging because the debugger will not be aware of the changed state of the VM and assumes that VM memory does not change once stopped.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
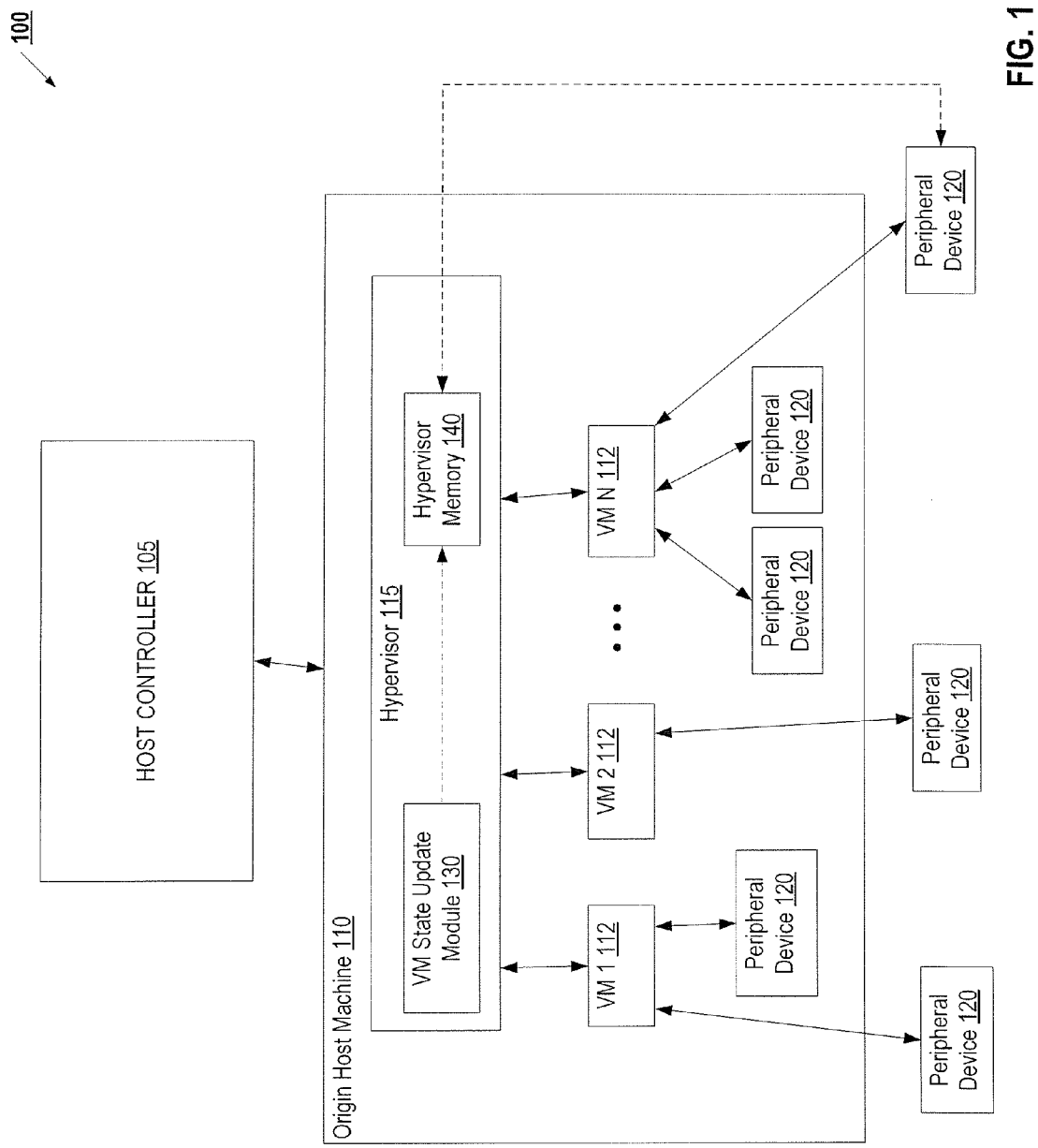
FIG. 1 is a block diagram of an exemplary virtualization architecture in which embodiments of the present invention may operate.

Embodiments of the invention provide a mechanism for synchronizing backend peripheral devices with a virtual machine (VM) running state. A method of embodiments of the invention includes modifying a running state of a VM managed by a hypervisor of a host machine, and updating a VM state indication associated with the VM to reflect the change in running state of the VM, wherein a peripheral device associated with the VM accesses the VM state indication to determine whether to continue processing a VM state changing instruction.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "modifying", "updating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for synchronizing backend peripheral devices with a VM running state. In embodiments of the invention, whenever the state of a VM changes from running to not running, or vice versa, the hypervisor that manages the VM will update an area of memory reflecting this state change. Any backend devices associated with the VM are programmed to check this special area of memory before accessing the VM. If it is determined that the VM is not running, then the peripheral device will stop processing. Otherwise, the peripheral device will continue processing with the VM.

FIG. 1 illustrates an exemplary virtualization architecture 100 in which embodiments of the present invention may operate. The virtualization architecture 100 may include one or more host machines 110 to run one or more virtual machines (VMs) 112. Each VM 112 runs a guest operating system (OS) that may be different from one another. The guest OS may include Microsoft Windows, Linux, Solaris, Mac OS, etc. The host 110 may include a hypervisor 115 that emulates the underlying hardware platform for the VMs 112. The hypervisor 115 may also be known as a virtual machine monitor (VMM), a kernel-based hypervisor or a host operating system.

In one embodiment, each VM 112 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110 as a local client. In one scenario, the VM 112 provides a virtual desktop for the client.

As illustrated, the host 110 may be coupled to a host controller 105 (via a network or directly). In some embodiments, the host controller 105 may reside on a designated computer system (e.g., a server computer, a desktop computer, etc.) or be part of the host machine 110 or another machine. The VMs 112 can be managed by the host controller 105, which may add a VM, delete a VM, balance the load on the server cluster, provide directory service to the VMs 112, and perform other management functions.

In embodiments of the invention, a VM 112 may utilize one or more peripheral devices 120. The peripheral devices 120 may be software that is implemented by the hypervisor 115 for the VM 112 (e.g., those devices 120 shown inside host machine 110), or hardware devices outside of the hypervisor 115 that are assigned to the VM (e.g., those devices shown outside of host machine 110). For example, peripheral devices 120 may include, but are not limited to, a mouse, graphics card, serial device, or network device.

Embodiments of the invention expose the VM 112 running state to its peripheral devices 120. Subsequently, upon each VM 112 write access from a peripheral device 120, the device 120 determines if the VM is running or not. If it is determined that the VM is not running, then the peripheral device 120 will stop processing. On the other hand, if it is determined that the VM 112 is running, then the peripheral device 120 will continue to perform the write access.

In one embodiment, the hypervisor 115 includes a VM state update module 130 that updates a VM state indication stored in memory. In one embodiment, the VM state indication is stored in the hypervisor memory 140, as illustrated. However, one skilled in the art will appreciate that the VM state indication may be stored in a variety of other locations including host machine 110 memory, external memory, and so on. The VM state indication reveals whether a VM 120 is running or not and may be a flag, a bit of memory, or a timer that tells when the last time the VM was started, to name a few examples. The VM state update module 130 is in charge of creating and updating this VM state memory indication. Upon the hypervisor 115 starting and stopping a VM 112, the VM state update module 130 will update the associated VM state indication in memory 140.

In one embodiment, upon initialization, each peripheral device 120 is programmed with the location of its VM state indication in the memory 140 and also with instructions to check the VM state indication before the peripheral device 120 makes any changes to the VM state (i.e., write access). In other embodiments, the location of the VM state indication in the memory 140 and the instructions to check the VM state indication are built-into the peripheral device 120 as part of the device. In this case, no modification to the peripheral device 120 is needed. In yet other embodiments, the peripheral device 120 may have an internal option to delay DMA. In this case, the hypervisor 115 can notify the peripheral device 120 to delay DMA when a VM 112 is stopped, and when the VM 112 is restarted the hypervisor 115 notifies the peripheral device 120 to restart DMA. Effectively, as a result the peripheral device 120 includes an internal state rather than accessing the central VM state indication in memory 140.

Subsequently, before a peripheral device 120 performs a write access to its VM 112 memory, it will check the VM state indication associated with the VM 112. Software peripheral devices 120 may simply look at the memory location, while hardware peripheral devices may perform a DMA read to verify the VM state. If the VM state indication reveals that the VM 112 is not running, then the peripheral device 120 will stop processing, queue any new requests, and not modify the VM memory.

Figure 2:
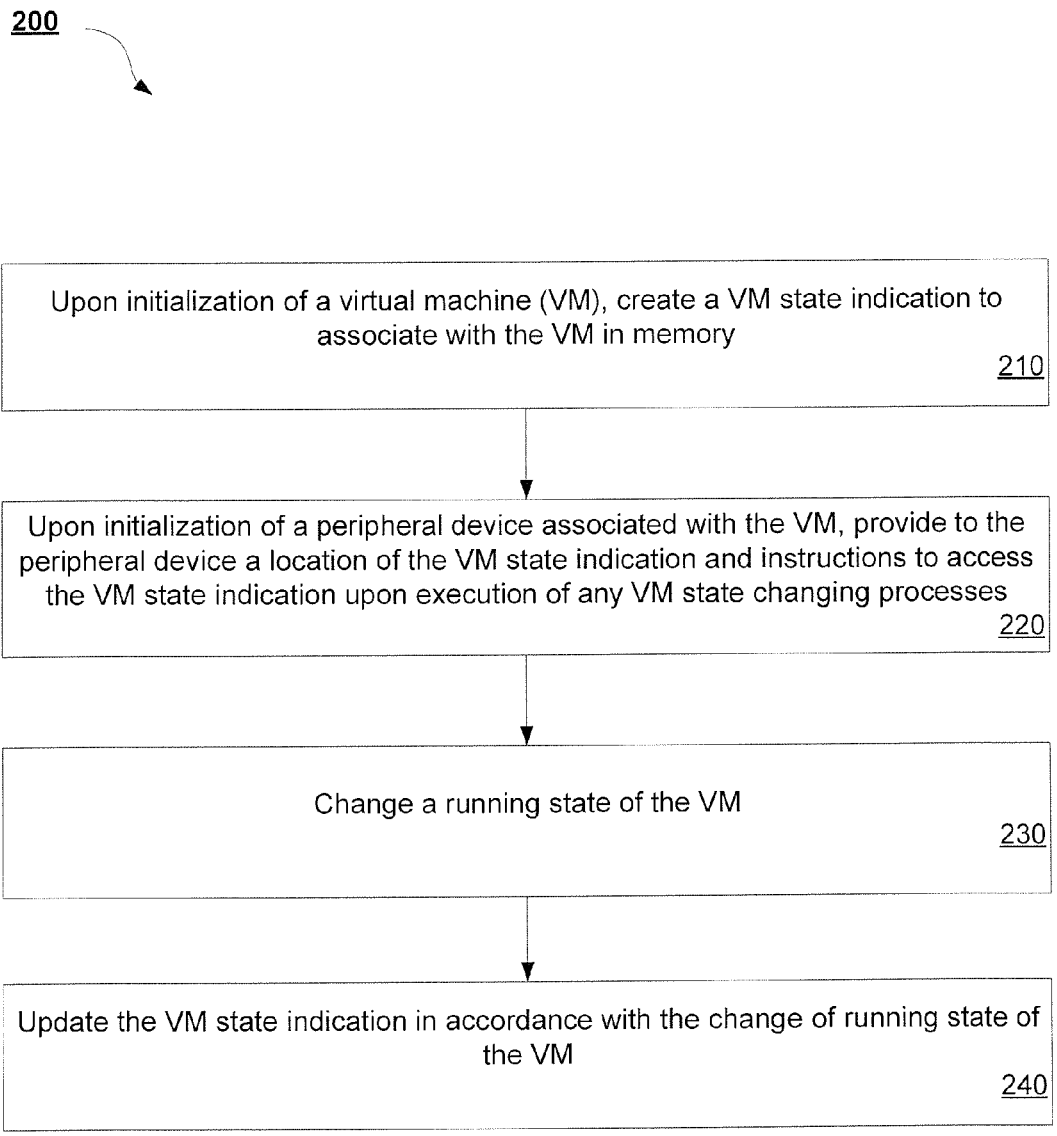
FIG. 2 is a flow diagram illustrating a method performed by a hypervisor for synchronizing backend peripheral devices with a VM running state according to an embodiment of the invention.

FIG. 2 is a flow diagram illustrating a method 200 performed by a hypervisor for synchronizing backend peripheral devices with a VM running state according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by hypervisor 115 of FIG. 1.

Method 200 begins at block 210 where a VM state indication is created in memory to associate with a VM. In one embodiment, the VM state indication is created upon the initialization of the VM by the hypervisor on the host machine. In some embodiments, the VM state indication may comprise a flag, a bit, or a timer. The VM state indication reflects whether the VM is running or not running at the current moment.

At block 220, the location of the VM state indication in memory is provided to a peripheral device upon initialization of the peripheral device. Instructions are also given to the peripheral device to access the VM state indication upon any execution of a VM state changing process by the peripheral device. At block 230, a running state of the VM is changed by the hypervisor. This includes stopping and starting the VM for a variety of reasons that are within the scope of the hypervisors operations. Subsequently, at block 240, the hypervisor updates the VM state indication in accordance with the change of the running state of the VM.

Figure 3:
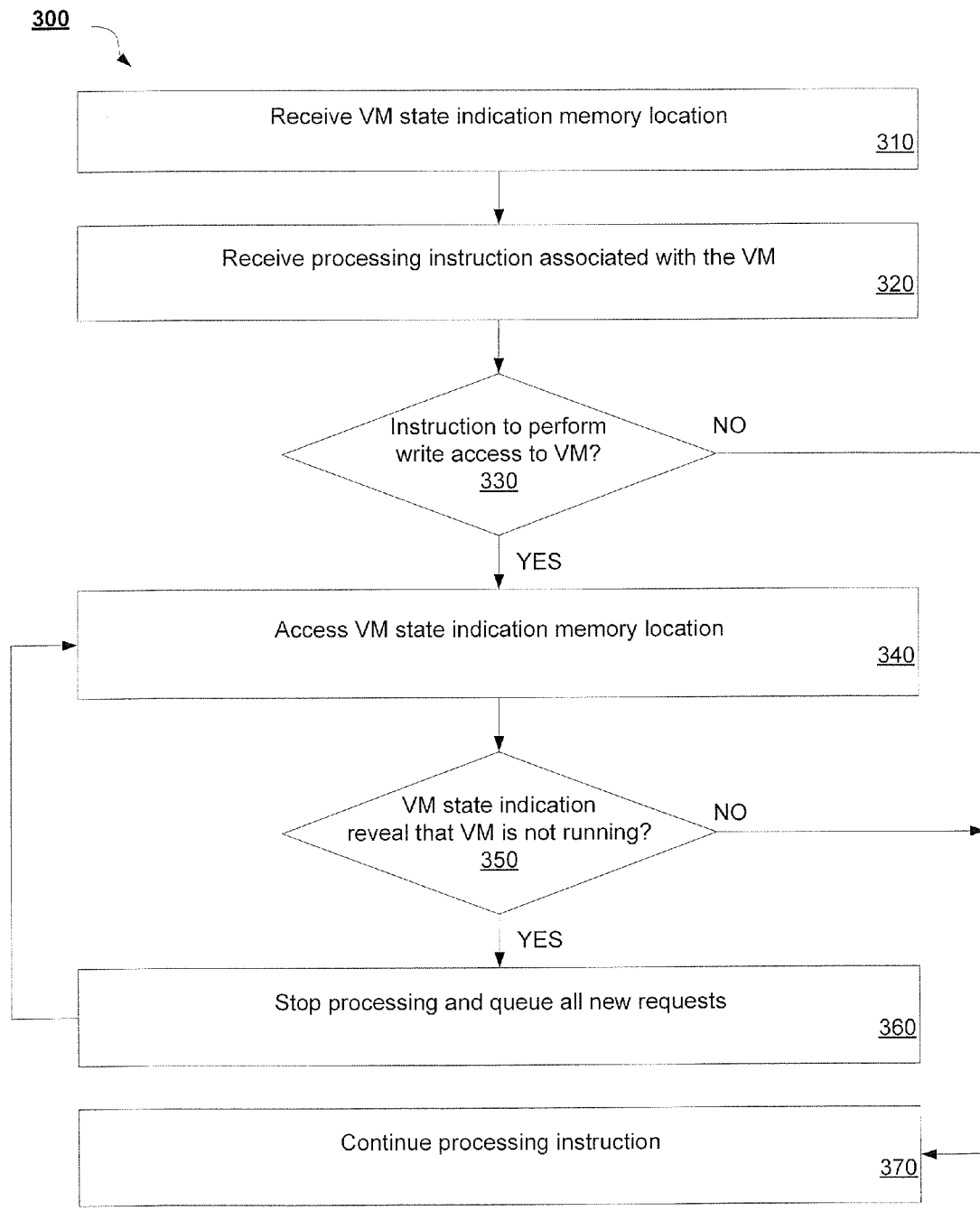
FIG. 3 is a flow diagram illustrating a method performed by a peripheral device for synchronizing backend peripheral devices with a VM running state according to an embodiment of the invention.

FIG. 3 is a flow diagram illustrating a method 300 performed by a peripheral device for synchronizing backend peripheral devices with a VM running state according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by peripheral device 120 of FIG. 1.

Method 300 begins at block 310 where a VM state indication memory location is received at a peripheral device associated with the VM. This VM state indication location may be provided by a hypervisor that manages the VM. In some embodiments, the VM state indication location and associated instructions are already built-in to the peripheral device. At block 320, a processing instruction associated with the VM is received. At decision block 330, it is determined whether this processing instruction is a write access to the VM. If the instruction is not a write access instruction, then processing may continue as usual at block 370.

However, if the instruction is a write access instruction, then method 300 proceeds to block 340 where the VM state indication memory location is accessed and read. At decision block 350, it is determined whether the VM state indication reveals that the VM is not running. If the VM state indication reveals that the VM is running, then method 300 continues to block 370 where the instruction processing continues as usual. On the other hand, if the VM state indication reveals that the VM is not running, then method 300 continues to block 360 where the peripheral device stops processing and queues all new requests.

Subsequently, method 300 returns to blocks 340 and 350 to continue monitoring the VM state indication to determine when the VM starts running again. When the VM state indication reveals that the VM is running at decision block 350, then method 300 may continue on to block 370 to continue processing the write access instruction and any other requests that were queued in the interim.

Figure 4:
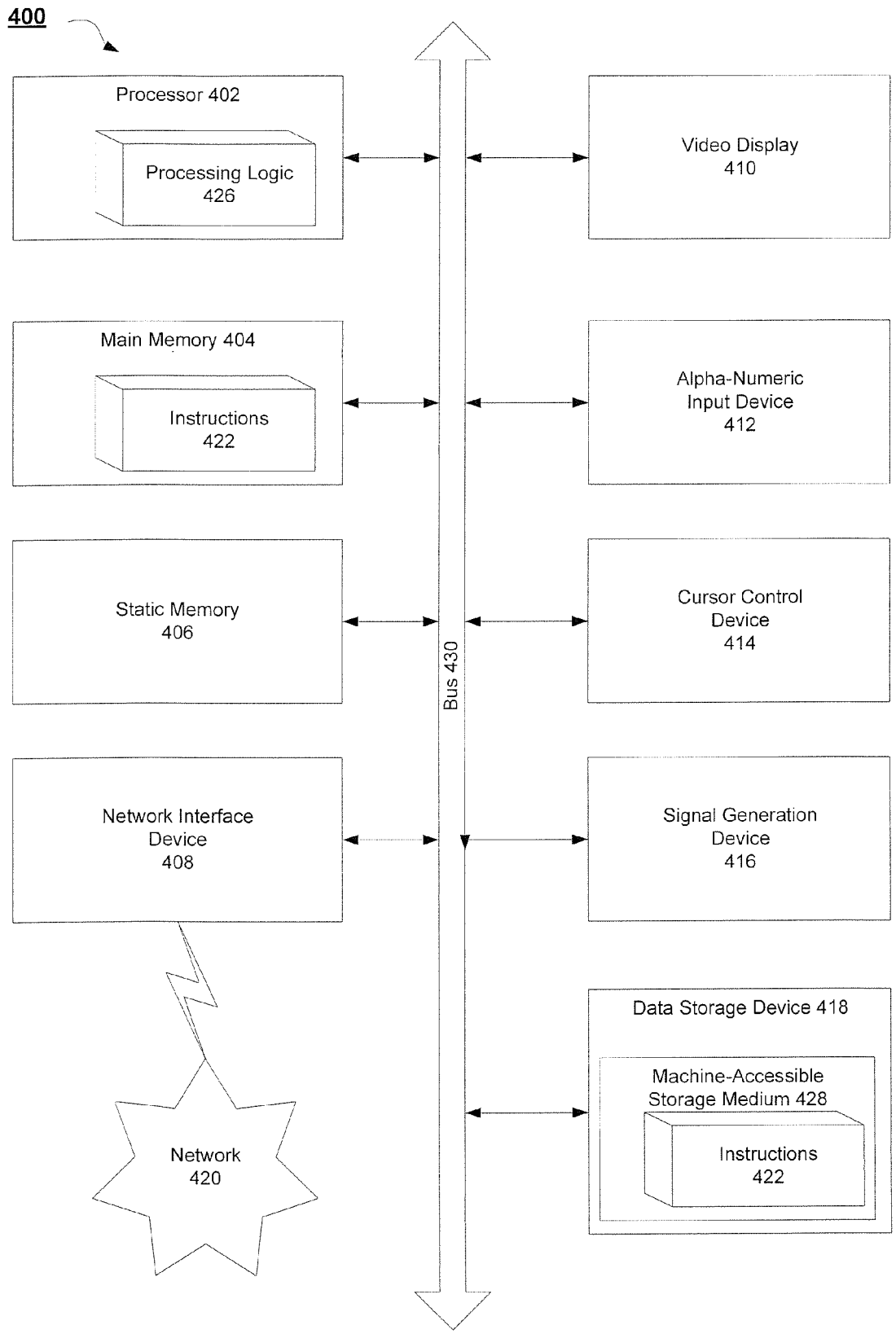
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 422 may store instructions to perform synchronizing backend peripheral devices with a VM running state by host machine 110 or peripheral device 120 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to perform methods 200 and 300 for synchronizing backend peripheral devices with a VM running state described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
    modifying, by a processing device executing a hypervisor a host machine, a running state of a virtual machine (VM) managed by the hypervisor, wherein the running state reflects whether the VM is running or not running;
    updating, by the hypervisor, a VM state indication associated with the VM to at least reflect the change in the running state of the VM from one of running to not running or not running to running; and
    providing, to a peripheral device by the hypervisor, a location in memory associated with the VM state indication, wherein the peripheral device associated with the VM accesses the VM state indication to determine whether to continue processing a VM state changing instruction, and wherein the peripheral device accesses the VM state indication upon a write access instruction to the VM.

2. The method of claim 1, wherein the VM state indication is created in the memory by the hypervisor when the VM is initialized.

3. The method of claim 1, wherein the VM state indication is at least one of a flag or a bit that reflects one of the VM running or the VM not running.

4. The method of claim 1, wherein the location in the memory associated with the VM state indication is provided to the peripheral device upon initialization of the peripheral device for the VM.

5. The method of claim 1, wherein the peripheral device accesses the VM state indication upon each write access instruction to the VM.

6. The method of claim 1, wherein the peripheral device continues processing the write access instruction if the VM state indication reveals that the VM is running.

7. The method of claim 1, wherein the peripheral device stops processing the write access instruction if the VM state indication reveals that the VM is not running.

8. The method of claim 7, wherein the peripheral device queues all new instructions while the VM state indication shows that the VM is not running.

9. A system, comprising:
    a processing device;
    a memory communicably coupled to the processing device; and
    a hypervisor executed by the processing device to run one or more virtual machines (VMs) from the memory that share use of the processing device, to:
        modify, by the processing device, a running state of a VM of the one or more VMs, wherein the running state reflects whether the VM is running or not running;
        update, by the processing device, a VM state indication associated with the VM to a least reflect the change in the running state of the VM from one of running to not running or not running to running; and
        provide, to a peripheral device, a location in memory associated with the VM state indication,
        wherein the peripheral device associated with the VM accesses the VM state indication to determine whether to continue processing a VM state changing instruction, and wherein the peripheral device accesses the VM state indication upon a write access instruction to the VM.

10. The system of claim 9, wherein the VM state indication is created in the memory by the hypervisor when the VM is initialized.

11. The system of claim 9, wherein the VM state indication is at least one of a flag or a bit that reflects one of the VM running or the VM not running.

12. The system of claim 9, wherein the location in the memory associated with the VM state indication is provided to the peripheral device upon initialization of the peripheral device for the VM.

13. The system of claim 9, wherein the peripheral device accesses the VM state indication upon each write access instruction to the VM.

14. The system of claim 9, wherein the peripheral device continues processing the write access instruction if the VM state indication reveals that the VM is running.

15. The system of claim 9, wherein the peripheral device stops processing the write access instruction if the VM state indication reveals that the VM is not running.

16. A non-transitory machine-readable storage medium including data that, when accessed by a processing device, cause the processing device to:
    modify, by the processing device, a running state of a virtual machine (VM) managed by the processing device executing a hypervisor of a host machine, wherein the running state reflects whether the VM is running or not running;
    update, by the processing device, a VM state indication associated with the VM to at least reflect the change in the running state of the VM from one of running to not running or not running to running; and
    provide, to a peripheral device, a location in memory associated with the VM state indication,
    wherein a peripheral device associated with the VM accesses the VM state indication to determine whether to continue processing a VM state changing instruction, and wherein the peripheral device accesses the VM state indication upon a write access instruction to the VM.

17. The non-transitory machine-readable storage medium of claim 16, wherein the VM state indication is created in the memory by the hypervisor when the VM is initialized.

18. The non-transitory machine-readable storage medium of claim 16, wherein the VM state indication is at least one of a flag or a bit that reflects one of the VM running or the VM not running.

19. The non-transitory machine-readable storage medium of claim 16, wherein the location in the memory associated with the VM state indication is provided to the peripheral device upon initialization of the peripheral device for the VM.

20. The non-transitory machine-readable storage medium of claim 16, wherein the peripheral device accesses the VM state indication upon each write access instruction to the VM.

* * * * *